United States Patent
Poirier

(10) Patent No.: US 10,322,643 B2
(45) Date of Patent: Jun. 18, 2019

(54) TRACTION BATTERY WITH REFERENCE SUPERCAPACITOR FOR CHARGE MONITORING

(71) Applicant: Ford Global Technologies, LLC, Dearborn, MI (US)

(72) Inventor: Eric Poirier, Brownstown, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 73 days.

(21) Appl. No.: 15/595,295

(22) Filed: May 15, 2017

(65) Prior Publication Data

US 2018/0326861 A1 Nov. 15, 2018

(51) Int. Cl.
*B60K 6/28* (2007.10)
*B60L 3/00* (2019.01)
*B60L 11/18* (2006.01)
*B60L 11/00* (2006.01)

(52) U.S. Cl.
CPC ............ *B60L 11/1862* (2013.01); *B60K 6/28* (2013.01); *B60L 3/0046* (2013.01); *B60L 11/005* (2013.01); *B60L 11/1866* (2013.01); *B60L 11/1887* (2013.01)

(58) Field of Classification Search
CPC .................................................. B60L 11/1862
USPC ........................................................ 320/104
See application file for complete search history.

(56) References Cited

U.S. PATENT DOCUMENTS

| | | | |
|---|---|---|---|
| 6,157,170 A | 12/2000 | Noda et al. | |
| 8,674,664 B2 | 3/2014 | Takizawa et al. | |
| 8,908,924 B2 | 12/2014 | Saito | |
| 9,349,070 B2 | 5/2016 | Kasaoki | |
| 2005/0088138 A1* | 4/2005 | Sasaki .................. | H02J 7/0065 320/101 |

FOREIGN PATENT DOCUMENTS

| | | |
|---|---|---|
| CN | 103121423 A | 5/2013 |
| CN | 104512333 A | 4/2015 |

OTHER PUBLICATIONS

Chinese Office Action dated Jul. 4, 2018 for Chinese Application No. 201610450909.6, 5 pgs.

* cited by examiner

*Primary Examiner* — Suresh Memula
(74) *Attorney, Agent, or Firm* — David B. Kelley; Brooks Kushman P.C.

(57) ABSTRACT

A capacitive circuit with a supercapacitor is connected in series with a traction battery to provide a current sensor to produce a sensed signal that is linear across the operating range of the traction battery. The linear response of the capacitive circuit is an improvement over merely measuring the voltage across the battery, which is not linear over some ranges, e.g., 20% to 80% state of charge.

20 Claims, 5 Drawing Sheets

TRACTION BATTERY WITH REFERENCE SUPERCAPACITOR FOR CHARGE MONITORING

TECHNICAL FIELD

The present application is generally directed to monitoring charge in a traction battery and, more specifically to using a reference capacitor for traction battery charge monitoring.

BACKGROUND

A vehicle that uses electric power for motive force needs to provide the user with the amount of charge in the traction battery, e.g., to calculate a driving range. One measure is State of Charge (SOC) of a traction battery. SOC can be a measure of battery charge in Coulomb, Amp*hours or %. SOC is usually determined based on current integration, cell voltage, or a combination of both.

SUMMARY

Traction battery monitoring or sensing can be assisted by placing a supercapacitor in series with the traction battery, groups of battery cells or a battery cell. A method for state of charge monitoring may include sensing voltage on a capacitive circuit with a supercapacitor connected in series with a traction battery to produce a sensed voltage, and determining traction battery capacity using the sensed voltage.

A method for vehicle battery control can include charging and discharging a traction battery, by a controller, according to a capacity of the traction battery that is derived by the controller from a sensed voltage across a capacitor of a capacitive circuit that is connected in series with the traction battery such that the sensed voltage linearly changes with current during the charging and discharging within an operating range of the traction battery.

In an example embodiment, sensing the voltage includes sensing a voltage that is linear across an operating range of the traction battery.

In an example embodiment, sensing the voltage includes sensing a voltage that is linear across a range of about 20% to 80% state of charge.

In an example embodiment, sensing the voltage includes sensing the voltage across parallel connected supercapacitors that are connected in series with the traction battery.

In an example embodiment, sensing the voltage includes sensing a voltage that is linear across an operating range of the traction battery.

In an example embodiment, sensing the voltage includes sensing a voltage that is linear generally around a plateau region of the battery's SOC-Voltage curve.

A vehicle may include systems to perform any of the methodologies for sensing traction battery state as described herein. The vehicle may include a traction battery, a capacitive circuit in series with the traction battery, an electric motor connected to the traction battery and the capacitive circuit to power wheels; and a controller to sense a voltage on the capacitive circuit and to determine a traction battery capacity using the sensed voltage. The capacitive circuit may include a supercapacitor.

In an example embodiment, the capacitive circuit matches voltage capacity of the traction battery.

In an example embodiment, the controller is to sense a voltage across the capacitive circuit, and the voltage across the capacitive circuit is linear across an operating range of the traction battery.

In an example embodiment, the capacitive circuit is configured to provide a linear voltage across a range of 20% to 80% state of charge of the traction battery.

In an example embodiment, the capacitive circuit includes parallel connected supercapacitors.

In an example embodiment, the capacitive circuit includes series connected supercapacitors.

In an example embodiment, capacitive circuit includes a first pair of two series connected supercapacitors and a second pair of two series connected supercapacitors, and wherein the first pair is parallel to the second pair.

In an example embodiment, the capacitive circuit provides a circuit equivalent of 5,000 farads and wherein the traction battery is a 300 volt Li-ion battery.

In an example embodiment, the controller uses $Q\_BAT = f[V\_CAP (I,t), \alpha\_0 \ldots \alpha\_n]$ to determine the charge $Q\_BAT$ is a function of the voltage $V\_CAP$ across the capacitive circuit.

An additional method for state of charge monitoring may be used in the vehicle. The method may include sensing voltage on a capacitive circuit connected in series with a traction battery to produce a sensed voltage that is linear across a range of 20% to 80% state of charge of the traction battery, and determining traction battery capacity using the sensed voltage.

In an example embodiment, sensing the voltage includes sensing a voltage that is linear across an entire operating range of the traction battery.

In an example embodiment, determining traction battery capacity using the sensed voltage includes integrating current through the capacitive circuit.

In an example embodiment, determining traction battery capacity includes circulating current through a plurality of supercapacitors in the capacitive circuit.

In an example embodiment, determining traction battery capacity includes circulating current through a plurality of supercapacitors connected in series with a battery cell of the traction battery.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is desirable to estimate charge in a traction battery. One technique is a current integration approach whose precision is determined by that of a current sensor. Hence, precise current integration approach requires a high accuracy current sensor, which adds significant costs and complexities to a vehicle. Another technique is a voltage-based approach, but this technique is limited, in the case of lithium ion (Li-ion) battery, by the presence of a plateau in the SOC vs. voltage curve, as well as hysteresis or polarization, and non-linearity. These characteristics of the SOC vs. voltage curves on Li-Ion cells, associated with to the peculiarity of this cell chemistry, makes it difficult to accurately track SOC changes based on voltage changes. This technique may not be as accurate as needed in an intermediate range of SOC. Some other types of batteries and capacitors are not however subject to that issue. The present disclosure hence uses one or more capacitors (or supercapacitors) to measure charge in a traction battery as capacitors exhibit wide and reversible linear changes in charge as a function of voltage, e.g., from the traction battery. In some embodiments described herein at least one supercapacitor is in series with an array of traction battery cells (e.g., Li-ion cells) for SOC monitoring. The added series capacitor is subject to the same current as the cells of the traction battery. The current that has circulated through the capacitor(s), as indicated by its changes in voltage, is therefore used to calculate the charge balance of the entire battery.

Figure 1:
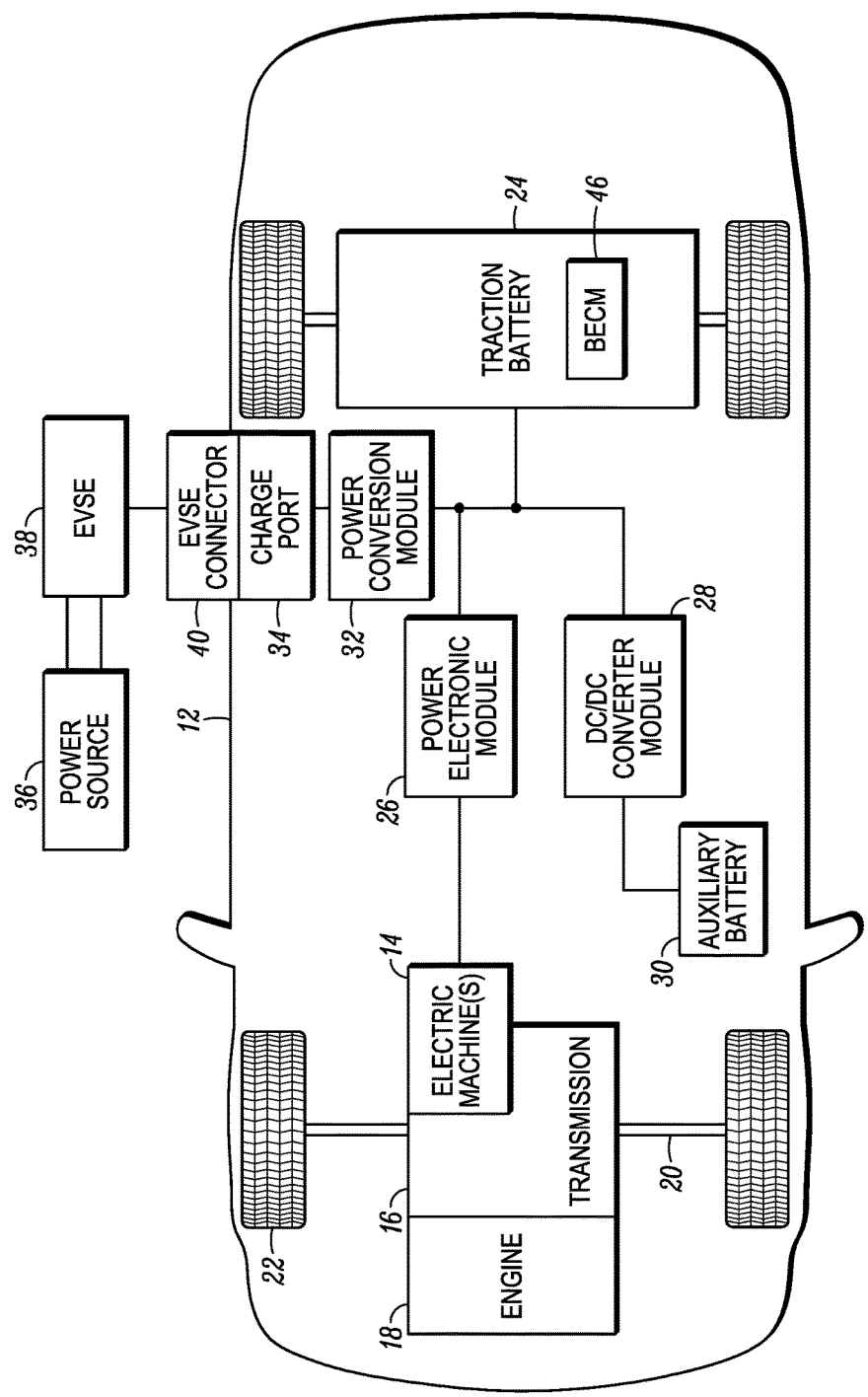
FIG. 1 is an example hybrid-electric vehicle with a battery pack.

FIG. 1 shows a plug-in hybrid-electric or electric vehicle 12 may comprise one or more electric machines 14 mechanically connected to a hybrid transmission 16. The electric machines 14 may be capable of operating as a motor or a generator. For hybrid vehicles, a transmission 16 is mechanically connected to an internal combustion engine 18. The transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also reduce vehicle emissions by allowing the engine 18 to operate at more efficient speeds and allowing the hybrid-electric vehicle 12 to be operated in electric mode with the engine 18 off under certain conditions. Similar advantages may be obtained with an electric vehicle that does not include an internal combustion engine 18.

A traction battery or battery pack 24 stores energy that can be used by the electric machines 14. A vehicle battery pack 24 typically provides a high voltage DC output. The traction battery 24 is electrically connected to one or more power electronics modules. One or more contactors (not shown) may isolate the traction battery 24 from other components when opened, and connect the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC current to function. The power electronics module 26 may convert the DC voltage to a three-phase AC current as required by the electric machines 14. In a regenerative mode, the power electronics module 26 may convert the three-phase AC current from the electric machines 14 acting as generators to the DC voltage required by the traction battery 24. The description herein is equally applicable to a pure electric vehicle. For a pure electric vehicle, the hybrid transmission 16 may be a gear box connected to an electric machine 14 and the engine 18 may be omitted as previously described. In the present disclosure invention, the traction battery 24 may include supercapacitors in series connection with cells in the traction battery 24. The charge stored within the traction battery 24 can be determined by measuring the voltage across the supercapacitor.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric cabin or component heaters, may be connected directly to the high-voltage without the use of a DC/DC converter module 28. The low-voltage systems may be electrically connected to an auxiliary battery 30 (e.g. a 12V or 24V battery).

Embodiments of this disclosure may include vehicles such as vehicle 12, which may be a hybrid or range-extender hybrid, or an electric vehicle or a plug-in hybrid vehicle in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically connected may transfer power using a wireless inductive coupling.

The various components illustrated in FIG. 1 may have one or more associated controllers to control and monitor the operation of the components. The controllers may communicate via a serial bus (e.g., Controller Area Network (CAN)) or via discrete conductors. One or more controllers may also operate in a stand-alone manner without communication with one or more other controllers. One of the controllers may be implemented by a Battery Energy Control Module (BECM) 46 to control various charging and discharging functions and battery cell charge balancing, for example. The BECM 46 may be positioned within traction battery pack 24 and may be connected to one or more sensor modules to sense the voltage across the supercapacitors.

Figure 2:
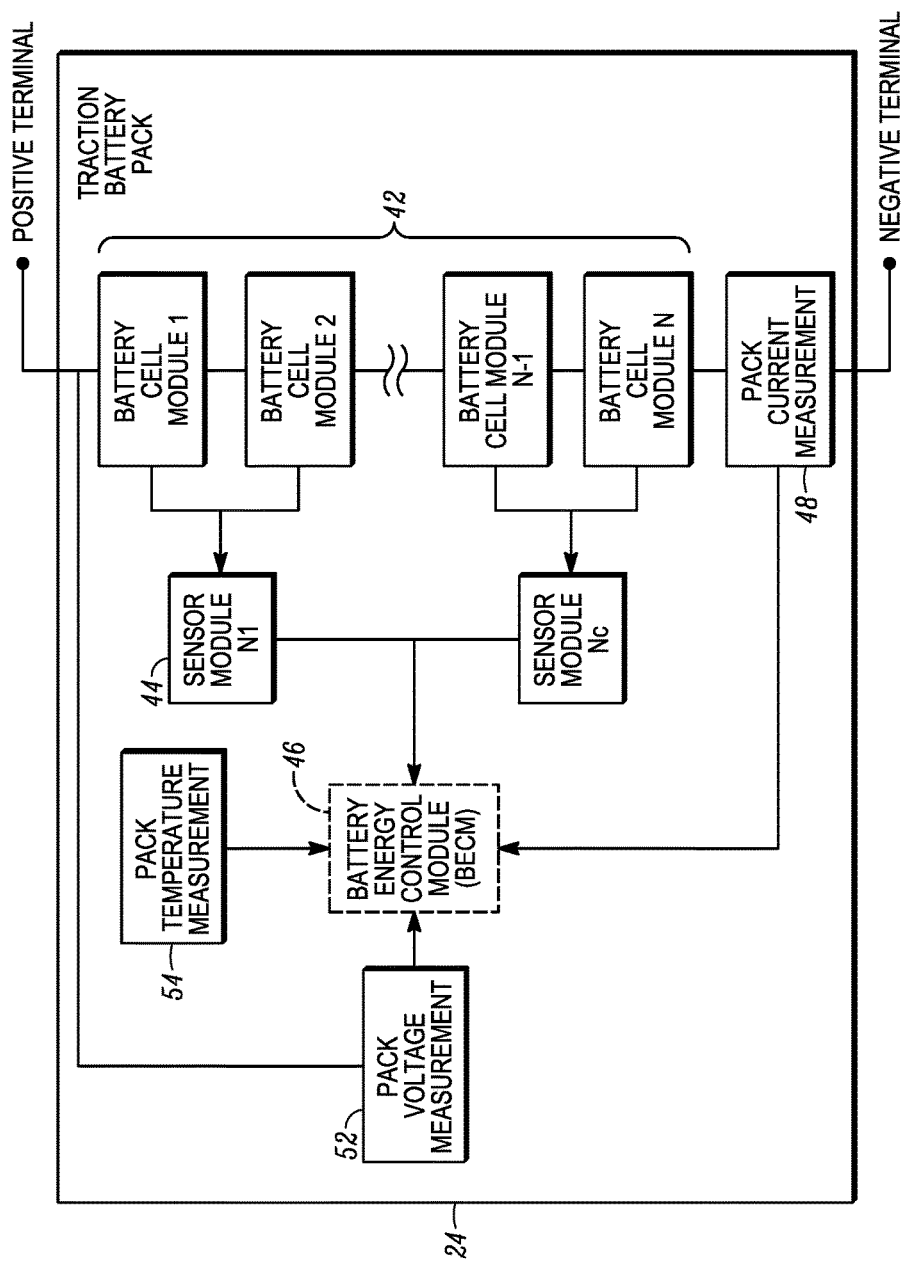
FIG. 2 is a battery pack arrangement comprised of battery cells and battery cell monitoring and controlling systems.

Vehicle traction battery packs may be constructed from a variety of chemical formulations. Typical battery pack chemistries include lead-acid, nickel-metal hydride (NIMH), or Lithium-Ion (Li-Ion). Other traction battery chemistries may be used. FIG. 2 shows a typical battery pack 24 in a simple series configuration of N battery cell modules 42. Other battery packs, however, may be composed of any number of individual battery cells connected in series, in parallel, or some combination thereof. The battery cell modules 42 include a battery cell and one or more capacitive devices that are connected in series with the battery cell. As previously described, a typical system may have one or more controllers, such as a Battery Energy Control Module (BECM) 46, that monitor and control the performance of the battery pack 24. The BECM 46 may monitor several battery pack bulk characteristics such as pack current 48, pack voltage 52 and pack temperature 54. The BECM 46 may also monitor SOC using the voltage(s) measured across supercapacitors that are connected in series with battery cells, respectively. The BECM 46 may have non-volatile memory such that data may be retained when the BECM is in an off condition.

The BECM 46 may include hardware and/or software to control various battery functions, such as battery cell charge balancing and battery thermal conditioning, for example. As generally understood by those of ordinary skill in the art, charge balancing may be more important for some battery chemistries than others, but is performed to balance the individual charges of each battery cell by discharging cells that are charged above a desired threshold level, and charging cells that have a charge below the desired threshold level. As described in greater detail below, BECM 46 may include PTC components to provide SOC or distance remaining calculations, which can be based on the sensed voltage across the series connected super capacitor in the battery cell module.

In addition to monitoring the battery pack bulk characteristics, BECM 46 may also monitor and/or control cell-level characteristics, such as individual or grouped cell voltages and/or the voltages across the supercapacitors in the battery pack 24. For example, the terminal voltage, current, and temperature of each cell may be measured in addition to measuring the voltage across the supercapacitor. The BECM 46 may include voltage monitoring circuits or sensor modules 44 to measure the voltage across the terminals of each of the N cell modules 42 of the battery pack 24. The voltage monitoring circuits 44 may be implemented by a network of resistors and capacitors configured to provide proper scaling and filtering of the voltage signals measured at the battery cell or the series connected supercapacitor. The voltage monitoring circuits 44 may also provide isolation so that high-voltages will not damage other circuitry with the BECM 46.

Figure 3A:
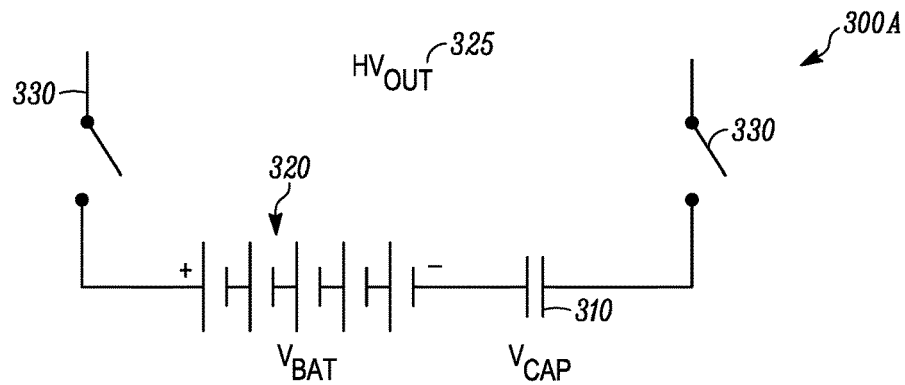
FIGS. 3A-3C are simplified schematics of a reference capacitor in series with a battery cell.
Figure 3B:
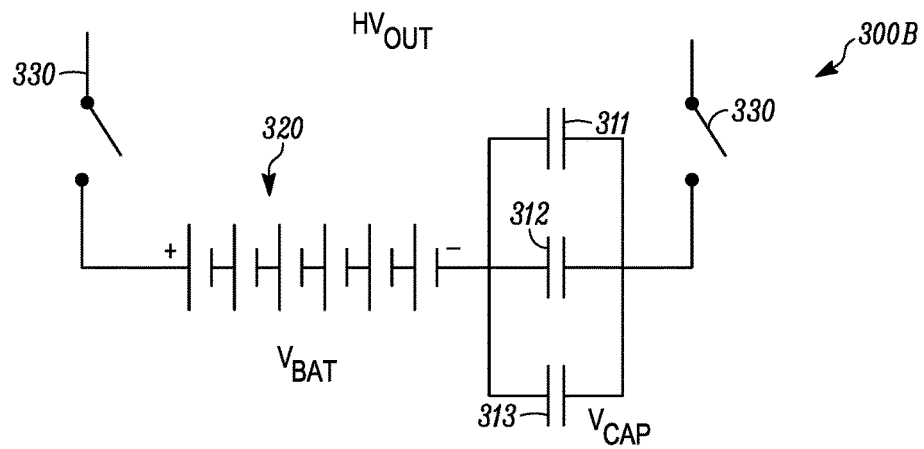
Figure 3C:
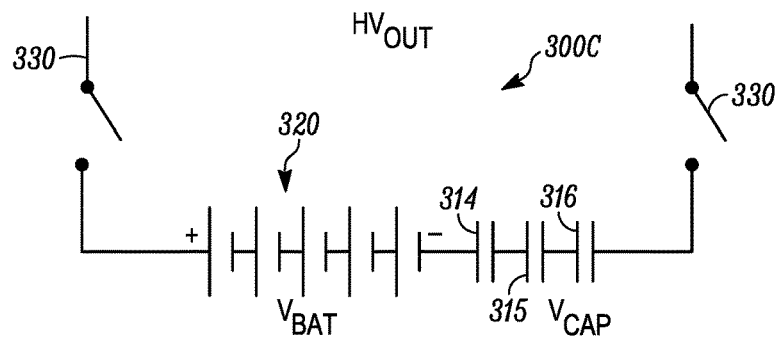

FIGS. 3A-3C show schematic circuits 300A-300C for supercapacitors 310 connected in series with the traction battery cell 320 with switches 330 selectively connecting the battery cell 320 to external circuitry to output a high voltage, $HV_{OUT}$ 325, to drive the electric machines 14 or charge the battery cell. The battery cell 320 provides a high voltage to supply electrical energy to the electrical machine 14 to provide motive force to the vehicle. The supercapacitor 310 is connected in series with the battery cell 320. Here, supercapacitor 310 is shown as connected to the negative battery cell terminal and to the negative switch. The voltage $V_{CAP}$ across the supercapacitor 310 is sensed by a sensing circuit that provides a signal to the BECM 46, which can determine the voltage $V_{CAP}$. $V_{CAP}$ is used to determine the charge, e.g., SOC, in the battery cell. The voltage $V_{CAP}$ is essentially linear across the operating range of the traction battery cell 320. The entire battery or groups of battery cells (module or arrays) 320 may have a supercapacitor 310 connected in series.

FIGS. 3B and 3C show the capacitance at the supercapacitor 310 to be the equivalent capacitance of N supercapacitors comprising a capacitive circuit. The capacitive circuit provides a capacitance and, hence, the voltage $V_{CAP}$. The circuit 300B has a plurality of supercapacitors 311, 312, 313 connected in parallel. The equivalent capacitance of N supercapacitors connected in parallel is the sum of the individual capacitances. If an individual capacitor cannot match the voltage of the traction battery or the battery cell, more than one capacitor can be connected in series to match the voltage range of the traction battery. The circuit 300C has a plurality of supercapacitors 314, 315, 316 connected in series. The equivalent capacitance of N supercapacitors connected in series is the sum of the reciprocals of the individual capacitances. To match a particular battery charge capacity and voltage specifications, combinations of parallel and series connected supercapacitors can be used, e.g., a combination of the capacitive circuits shown in circuits 300B and 300C. In an example embodiment, two sets of two series connected supercapacitors are connected in parallel. Such a configuration of the capacitance circuit can use the parallel connection to match the capacity of the traction battery and the series connection allows the capacitive circuit to be in its linear range in the operating range of the traction battery or cell.

Embodiments of the present disclosure use the properties of the capacitance of the supercapacitor connected in series with the traction battery. In contrast with Li-ion cells, a capacitor's voltage changes linearly as a function of its charge Q:

$$V_{CAP}=C^{-1}Q$$

where C is the capacitance (in Farad). The capacitor voltage $V_{CAP}$ relates to the integral of the current as:

$$V_{CAP}=1/c\int_{t_0}^{t}I^*dt$$

When combined in series with Li-ion cells in a battery, the change in the capacitor's voltage is thus function of the current that has circulated in the entire battery. The battery charge can thus be expressed as general function of Vcap, and other parameters:

$$Q_{BAT}=f[V_{CAP}(I,t), \alpha_0 \ldots \alpha_n]$$

where $\alpha_0 \ldots \alpha_n$ are non-ideality parameters experimentally determined (e.g. self-discharge, temperature correction, etc). The use of the supercapacitor in series with the traction battery cells, in contrast with Li-ion cell voltage monitoring, benefits from the reversibility, linearity and quick response of the capacitor's voltage vs. charge curve, e.g., as shown in FIG. 4.

Figure 4:
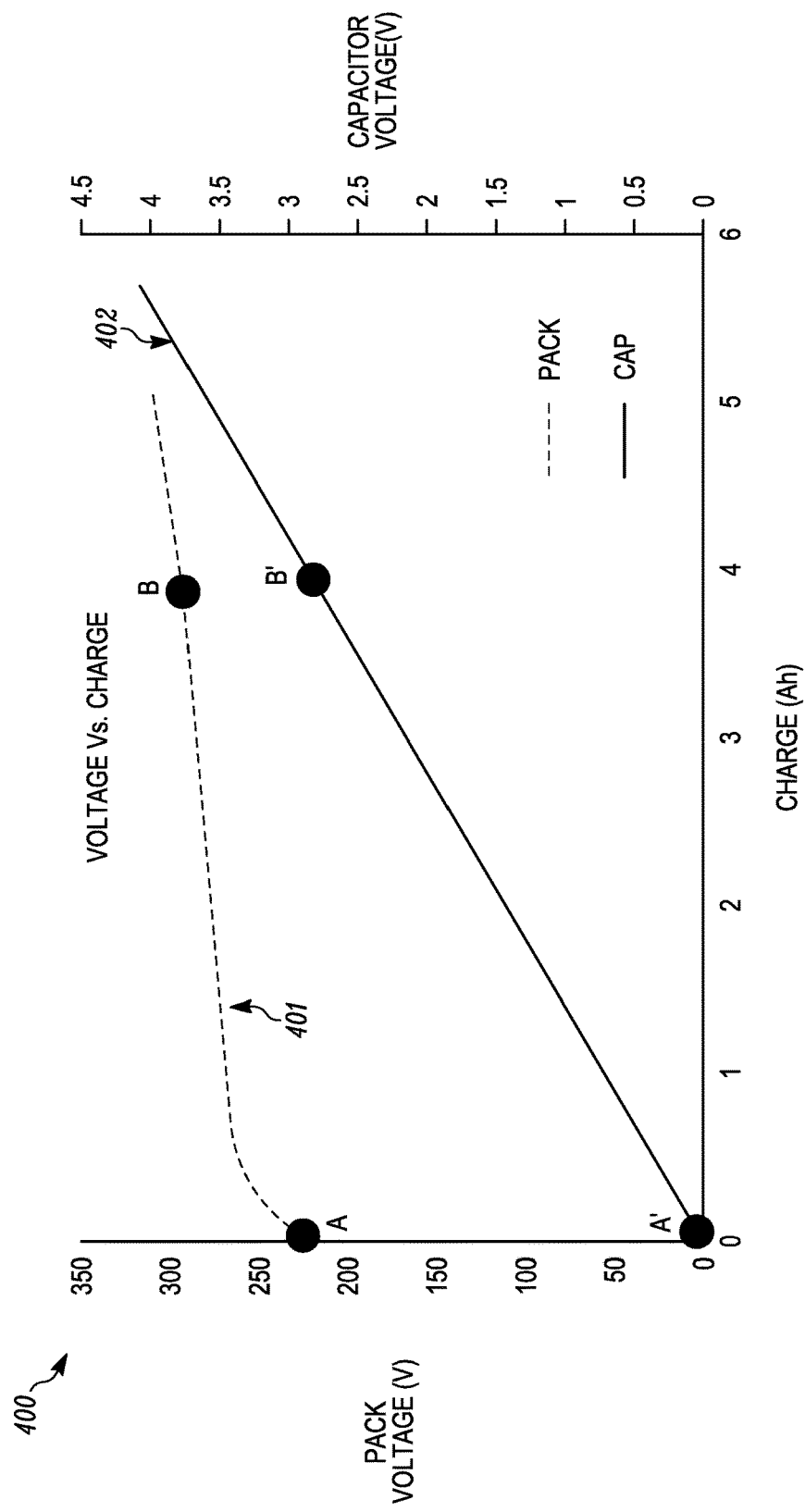
FIG. 4 shows a graph of a conventional voltage measurement and a supercapacitor in series for battery monitoring.

FIG. 4 shows a graph 400 of a conventional voltage 401 and a voltage 402 measured at the supercapacitor as described herein. The conventional voltage 401 is shown on the left ordinate and can as measured at the traction battery, e.g., $V_{BAT}$. The traction battery can be a 300V Li-ion battery. As shown in the example of FIG. 4, the conventional voltage is relatively flat between about 20% SOC and 80% SOC, here shown as about 1.0 amp-hour to about 4.0 amp-hour. The SOC range can be +/−1% or +/−2% for the ranges described herein, in an example. The range can be between 25%-75% SOC or between 17.5% to 82.5% SOC. The battery pack voltage only ranges from about 250 volts to about 270 volts over the plateau region of graph 401. Other batteries may have a flat region of response between the charge and the voltage at the battery terminals relative to the charge.

The conventional voltage does not vary enough to indicate precisely the SOC in this range. For the sensed capacitor, it has a value of 5000 Farads. The sensed capacitor can be a single capacitor (e.g., battery module configuration 300A), multiple capacitors in a parallel, series or combination configuration (e.g., battery module configuration 300B, 300C or a combination of 300B and 300C). The sensed capacitor voltage 402 is essentially linear throughout the entire range and particularly over the range of 1.0 amp-hour to about 4.0 amp-hour or 20% SOC to 80% SOC. This linear behavior of the capacitor voltage is reversible as the traction battery capacity changes through discharging and charging. Thus, voltage 402 can be used to calculate the SOC across the entire range of the SOC or amp-hour capacity of the traction battery and with greater resolution. In an example embodiment, using the presently described methods and systems allows for determination of the SOC without requiring a high-resolution measurement of the traction battery voltage, e.g., twelve bits or more, to differentiate along the flat portion of the conventional voltage 401. Examples described herein may provide for a non-flat response by using a supercapacitor or a properly sized capacitive circuit in regions where the battery voltage, e.g., pack voltage, is flat.

In some embodiments described herein, one or more supercapacitor is connected in series with cells in a traction battery array for the purpose of battery charge or SOC monitoring. The current flowing through capacitor(s) and cells connected in series is the same across all components of the battery. For instance, an increase in the voltage Vcap from 0 to 2.7 V over a 5000 F reference supercapacitor indicates that a charge of $Q=C*V=5000\ F*2.7\ V=13500\ C$ (or 3.75 Amp-hour) has circulated through the entire series array. Therefore, changes in the charge of an entire battery containing a reference capacitor can be established as a function of changes in voltage across the same capacitor (Vcap). More specifically, the battery energy control module can calculate the capacity of the whole pack as $Cpack=f[Vcap\ (I,t),\ a_0\ \ldots\ a_n]$, where $Vcap=I*t/C$, and $a_i$ are experimentally determined parameters accounting for the non-ideality of the system. This may be analogous to the current integration approach, except for the reference capacitor voltage inherently indicating the actual integrated charge value, i.e., the charge Q or a "A*h". For implementation, the reference capacitor may be sized to operate over a charge/voltage range matching that of the battery cells. For that purpose several capacitors may be used in series/parallel configuration to obtain a specific capacitance value. The present systems and methods may increase charge monitoring precision, e.g., based on the linear and reversible behavior of a supercapacitor, as well as its general ability to reach completely charged/discharged states (which may provide scaling over a somewhat wider voltage range than Li-Ion cells). The added capacitor(s), while providing for a battery charge reference, does not change significantly the charge/discharge plateau characteristics of the pack, as it contributes only to a small fraction of the total battery voltage and charge. Similarly, the voltage from the supercapacitor is significantly less that the voltage from the traction battery, e.g., Vcap«Vpack. In an example, the voltage contribution from the super capacitor is about two orders of magnitude less than the contribution from the traction battery. Moreover, the supercapacitor is a low cost component that also adds charge capacity to the battery.

Figure 5:
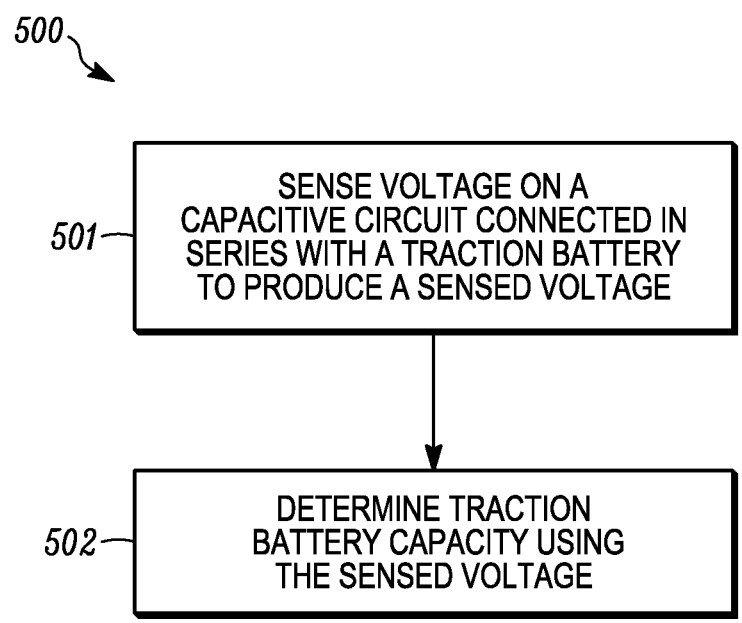
FIG. 5 is a flow chart showing a method of monitoring a traction battery according to an example embodiment.

FIG. 5 shows a method 500 of determining the charge in a traction battery, e.g., the state of charge. At 501, the electrical energy across the capacitive circuit is measured. The capacitive circuit is connected in series with a traction battery. The capacitive circuit includes at least one supercapacitor and is able to carry the voltage supplied by the traction battery thereacross as demanded by the battery control module, e.g., BECM. The voltage across the capacitive circuit is linear as a function of charge Q. The capacitive circuit has a voltage that relates to the integral of current (in Ah). At 502, the battery charge is determined from the sensed signal across the capacitive circuit. When the capacitive circuit is in series with the traction battery cells, the change in the capacitor's voltage is a function of current that has circulated through the entire battery cells. Once determined, various charging and discharging schedules for the traction battery 24 may be developed and executed by, for example, the BECM 46. If the battery charge exceeds a maximum threshold, the BECM 46 may prevent further charging of the traction battery 24 (with regenerative energy captured by the electric machine 14, etc.) until the battery charge falls below another threshold. If the battery charge falls below a minimum threshold, the BECM 46 may prevent further discharging of the traction battery 24 (to power the electric machine, etc.) until the battery charge exceeds another threshold. Charge profiles that depend on the battery charge may also be adjusted accordingly, etc. The capacitor's voltage monitors the battery charge and benefits from reversibility, linearity and a quick response relative to the charge in the battery.

The present disclosure describes using one or more supercapacitors connected in series in an array of traction battery cells (e.g., Li-ion cells) for the purpose of battery charge monitoring. For compatibility with Li-ion cells, more than one capacitors could be connected in combined series/parallel configurations to form one "equivalent" capacitor. An equivalent capacitor is what the power circuit sees when multiple supercapacitors are operating as a single capacitor. The voltage across the added supercapacitor, or equivalent capacitor, is indicative of a current integrated charge through the whole array. The supercapacitor is an electrical energy storage device that acting like a current sensor but with a linear operating range across the voltage range of the traction battery, and in particular in the 20%-80% SOC range or generally around the plateau region of the battery's SOC-Voltage curve.

The present disclosure describes a supercapacitor, which may be a high-capacity capacitor with capacitance values much higher than typical capacitors. A supercapacitor may be one capable of operating at the high voltages of a battery cell for a traction battery. In an example, a supercapacitor is not an electrolytic capacitor nor a rechargeable battery. A supercapacitor may store 10 to 100 times more energy per unit volume or mass than electrolytic capacitors, can accept and deliver charge much faster than batteries, and tolerate many more charge and discharge cycles than rechargeable batteries. The supercapacitors may provide many rapid charge/discharge cycles rather than long term compact energy storage, as be used in an electric vehicle. The supercapacitors may use electrostatic double-layer capacitance and electrochemical pseudocapacitance, both of which contribute to the total capacitance of the capacitor in place of traditional solid dielectric layer. The supercapacitor, as used in some examples described herein, may be rated in farads, which is several thousands of times higher than the electrolytic capacitor.

The present systems and methods for sensing the battery capacity may be scaled to a system for providing electrical power that is larger than a vehicle traction battery or smaller than a vehicle traction battery, e.g., a mobile electronic device. The capacitor is connected in series to a battery of the mobile electronic device. The capacitor is sized so that it has a similar relationship to the mobile device battery as the supercapacitor has relative to a traction battery.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for vehicle battery control, comprising:
   charging and discharging a traction battery, by a controller, according to a capacity of the traction battery that is derived by the controller from a sensed voltage across a capacitor of a capacitive circuit that is connected in series with the traction battery such that the sensed voltage linearly changes with current during the charging and discharging within an operating range of the traction battery.

2. The method of claim 1, wherein the capacity of the traction battery is defined by state of charge of the traction battery.

3. The method of claim 2, wherein the operating range corresponds to a state of charge range of 20% to 80%.

4. The method of claim 1, wherein the capacitor is a supercapacitor.

5. The method of claim 1, wherein the capacitor includes a plurality of capacitors connected in series or parallel.

6. The method of claim 1, wherein the operating range corresponds to a plateau region of a SOC-Voltage curve of the traction battery.

7. A vehicle comprising:
   a traction battery;
   a capacitive circuit in series with the traction battery such that voltage of the capacitive circuit changes linearly with traction battery current;
   an electric motor connected to the traction battery and the capacitive circuit to power wheels; and
   a controller to charge and discharge the traction battery according to a capacity of the traction battery that is derived by the controller from the voltage.

8. The vehicle of claim 7, wherein the capacitive circuit matches voltage capacity of the traction battery.

9. The vehicle of claim 7, wherein the voltage changes linearly with traction battery current within a range corresponding to 20% to 80% state of charge of the traction battery.

10. The vehicle of claim 7, wherein the capacitive circuit includes parallel connected supercapacitors.

11. The vehicle of claim 7, wherein the capacitive circuit includes series connected supercapacitors.

12. The vehicle of claim 7, wherein the capacitive circuit includes a first pair of two series connected supercapacitors and a second pair of two series connected supercapacitors, and wherein the first pair is parallel to the second pair.

13. The vehicle of claim 12, wherein the capacitive circuit provides a circuit equivalent of 5,000 farads and wherein the traction battery is a 300-volt Li-ion battery.

14. A vehicle comprising:
   a traction battery; and
   a controller to charge and discharge the traction battery according to a capacity of the traction battery that is derived by the controller from a sensed voltage across a capacitor of a capacitive circuit that is connected in series with the traction battery such that the sensed voltage linearly changes with current during the charge and discharge within an operating range of the traction battery.

15. The vehicle of claim 14, wherein the capacitor is a supercapacitor.

16. The vehicle of claim 14, wherein the capacitor includes a plurality of capacitors connected in series or parallel.

17. The vehicle of claim 16, wherein the capacitor includes a first pair of two series connected supercapacitors and a second pair of two series connected supercapacitors, and wherein the first pair is parallel to the second pair.

18. The vehicle of claim 14, wherein the capacity of the traction battery is defined by state of charge of the traction battery.

19. The vehicle of claim 14, wherein the operating range corresponds to a state of charge range of 20% to 80%.

20. The vehicle of claim 14, wherein the capacitive circuit matches voltage capacity of the traction battery.

* * * * *